Figures 1, 2:
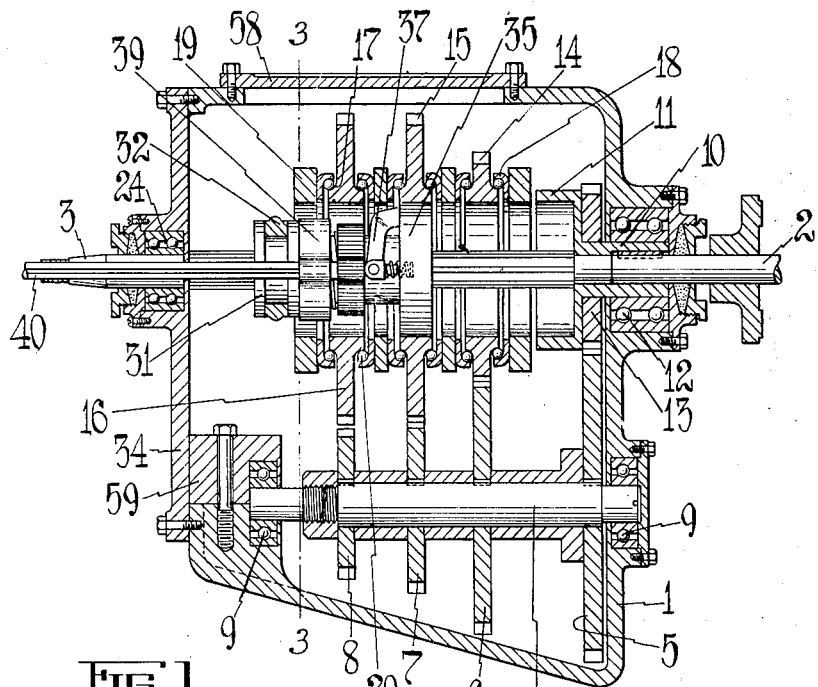

Jan. 9, 1934.　　　F. H. HADFIELD　　　1,943,016
CLUTCH MECHANISM
Filed Dec. 27, 1929　　　3 Sheets-Sheet 1

F. H. Hadfield
INVENTOR

By: Marks & Clerk
Attys

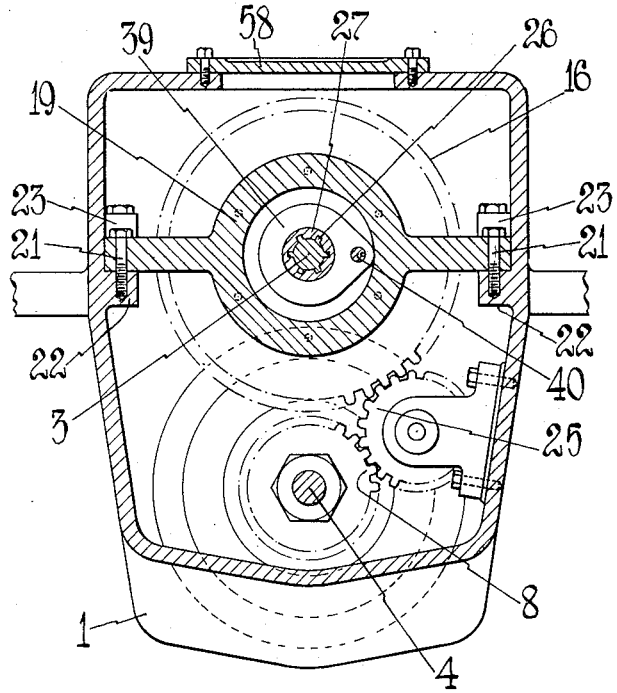
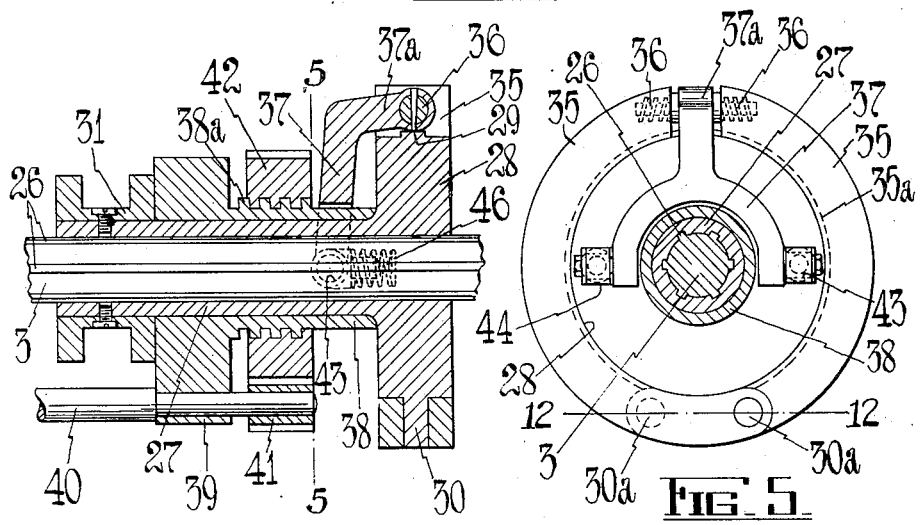

Jan. 9, 1934.  F. H. HADFIELD  1,943,016
CLUTCH MECHANISM
Filed Dec. 27, 1929   3 Sheets-Sheet 3
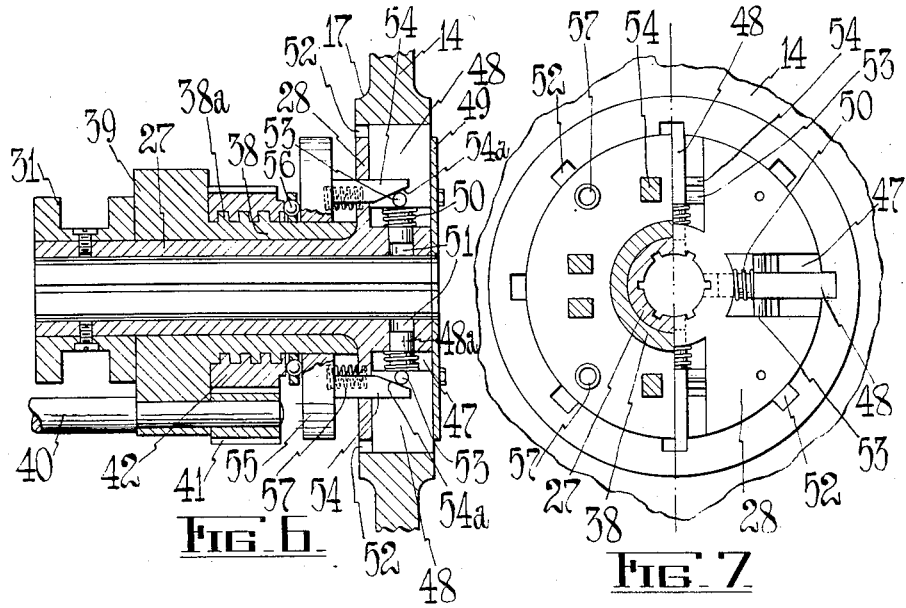
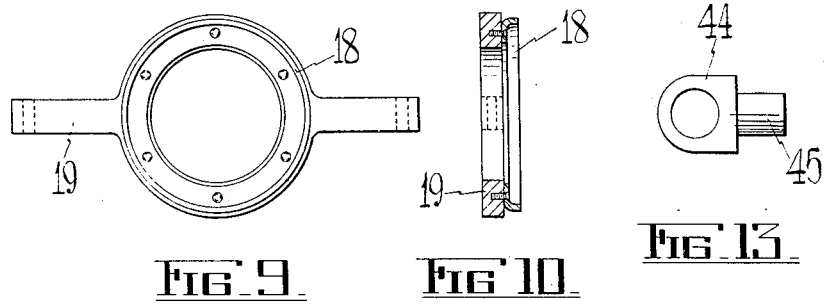
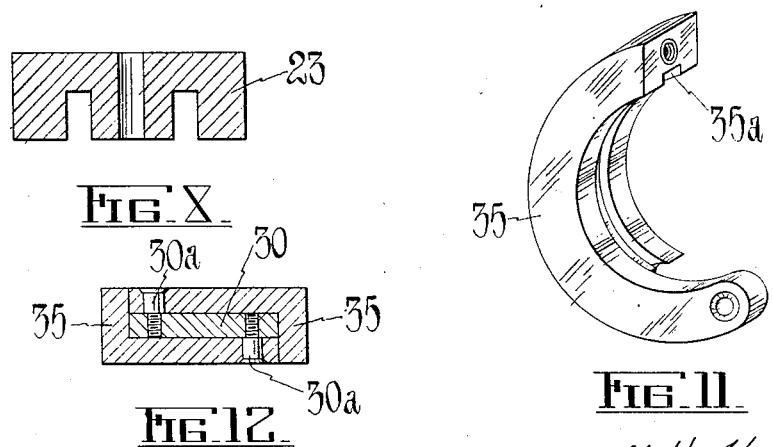
F. H. Hadfield
INVENTOR
By Marks & Clerk
ATTYS.

Patented Jan. 9, 1934

1,943,016

UNITED STATES PATENT OFFICE 1,943,016

CLUTCH MECHANISM

Frederick Howe Hadfield, Auckland, New Zealand

Application December 27, 1929
Serial No. 416,901

6 Claims. (Cl. 192—75)

This invention relates to change speed gear and reverse mechanism, interposed between a driving shaft and a driven shaft, for the purpose of enabling the latter to be rotated at various speeds and in the reverse direction to the direction of rotation of the driving shaft.

The object of the invention is to provide an improved type of clutch mechanism, particularly designed for use in change-speed gears which is of simple construction and efficient in operation.

The above and other features of invention comprised in the construction and the arrangement of the parts comprising the clutch employed, will now be more particularly described with the aid of the accompanying drawings, wherein Fig. 1 is a longitudinal sectional elevation, Fig. 2 a longitudinal sectional plan view, and Fig. 3 a cross sectional elevation taken through the line 3—3 Fig. 1, of a gear box containing the improved mechanism, Fig. 4 a longitudinal sectional elevation of the clutch for drivably connecting the gear wheels surrounding the shaft to be driven, to the latter, and Fig. 5 a cross sectional view taken through the line 5—5 Fig. 4, Fig. 6 is a longitudinal sectional elevation, and Fig. 7 a part end view and part cross sectional view of an alternative form of clutch, Fig. 8 a sectional view of one of the bridge pieces for securing the ends of cross members in the gear box, Fig. 9 an elevation, and Fig. 10 a cross sectional view of one of the cross members, or ball race carriers;

Fig. 11 a perspective view of one of the clutch shoes,

Fig. 12 a sectional plan view taken through the line 12—12 Fig. 5,

Fig. 13 a detail view showing one of the rocking pieces mounted on the forked member of the clutch.

In the drawings, 1 represents the gear box, 2 the driving shaft, 3 the shaft to be driven, and 4 the lay or countershaft, the latter having keyed thereon the gear wheels, 5, 6, 7 and 8, and being mounted in ball bearings 9.

The driving shaft 2 has keyed thereon the sleeve 10 of the rim disc 11 said sleeve running in the ball bearing 12, and also having as a fixture thereon the gear wheel 13 which is constantly in mesh with the gear wheel 5 on the lay or countershaft 4, whereby the latter rotates continuously in the one direction, so long as the driving shaft 2 is being rotated by the prime mover employed.

The gear wheels 14, 15, and 16, which surround the driven shaft 3, but which are not permanently drivably connected thereto, are formed with hollow circular shoulders 17, between which and flanged rings 18 secured to cross members 19, are placed balls 20, the latter and the rings 18 providing the bearings for the wheels 14, 15 and 16.

The cross members 19 rest on and are secured by fastenings 21 to ledges 22 on the sides of the gear box 1, the intermediate cross members 19 being maintained in the correct positions by bridge pieces 23 (Fig. 8) which fit over the ends of the cross members 19 and serve both as distance pieces and caps to said ends, fastenings 21 being passed through the bridge pieces 23 and the ledges 22. The cross members 19 and the gear wheels 14, 15 and 16, contain openings or are bored out to the same diameter as the internal diameter of the rim disc 11, to receive a clutch body slidable on the shaft 3 to be driven, as will be hereinafter described, the latter being supported by and running in the ball bearing 24, and the inner end of the sleeve 10 of the rim disc 11.

The gear wheel 14 meshes with the wheel 6, the wheel 15 with the wheel 7, and the wheel 16 with an intermediate wheel 25 (Fig. 3) mounted on the side of the box 1, the latter wheel meshing with the wheel 8, said wheels 16, 25 and 8, constituting the reverse gearing through which shaft 3 is driven in the reverse direction to the shaft 2.

The shaft 3 is splined or is fitted throughout its length within the box 1 with keys 26, except at its end entered in the sleeve 10, and on said splined portion of the shaft 3 there is slidably keyed the clutch body 27 which has a circular outer surface, and at one end a circular end piece 28 formed with a central circumferential rib 29, and a lower central projecting portion or lug 30.

A grooved collar 31 is secured on the clutch body 27 at the opposite end to the end piece 28, a fork 32 secured on a rod 33 slidable through the bearing box end 34, engaging in said collar 31.

The clutch shoes 35 contain grooves 35a in their inner surfaces to pass upon the rib 29 of the end piece 28 and are rebated at their lower ends to pass and fit one at each side of the projecting portion or lug 30, and be pivoted to the latter as shown at 30a (Fig. 12).

At their opposite or upper ends the clutch shoes 35 are bored and screw-threaded to take a single screw 36 having a right handed screw thread cut on one end and a left handed screw thread cut on the other end, while on the centre of said screw 36 is keyed the bent centre portion 37a of a forked member 37 which passes over a sleeve 38 surrounding and free on the clutch body 27.

The sleeve 38 is formed integral with a plate 39 through which passes one end of a rod 40 also slidable through the end 34 of the gear box.

Keyed on the rod 40 is a pinion 41 meshing with a toothed wheel 42 which is screw threaded internally to work on a screw thread 38a cut on the sleeve 38, over which the forked member 37 passes.

Pins 43 projecting outwards from the lower end of the forked member 37 one at each side thereof carrying rocking pieces 44 formed with studs 45 and rounded surfaces, the latter being maintained in contact with the internally screw threaded wheel 42 under the action of springs 46 which are entered in the end piece 28 of the clutch body 27, and press on the studs 45 of the rocking pieces 44, said springs 46 being in compression between the end piece 28 and said internally screw threaded toothed wheel 42.

The clutch shoes 35 which rotate with the clutch body 27 and the splined shaft 3 are adapted to be contracted through turning movement of the rod 40 actuated from a suitably positioned pedal or lever, the rod turning the pinion 41, and through the latter the wheel 42, which screws along the thread 38a on the sleeve 38 and against the rocking pieces 44 on the forked member 37, so that the latter is acted upon to impart turning movement to the screw 36 the right and left handed screw threads on which draw the ends of the shoes 35 together and so contract the clutch.

By holding the shoes 35 contracted and sliding the clutch body 27 along the splined portion of the shaft 3, the shoes 35 can be passed into the rim disc 11, or into whichever of the wheels 14, 15, 16 it is desired to clutch to the shaft 3, following which, reverse turning movement of the rod 40 assisted by the expanding action of the springs 46, results in the shoes 35 being expanded to grip the interior of the rim disc 11, or whichever of the wheels 14, 15, 16 they are inserted in, and to drivably connect said disc, or wheel, with the shaft 3. If desired, the exterior surfaces of the shoes 35 and the interiors of the rim disc 11 and the wheels 14, 15 and 16 can be serrated, toothed or corrugated to enable a positive grip to be obtained between the parts.

With the clutch shoes 35 expanded in and gripping the rim disc 11, the shaft 3 is driven at the same speed and in the same direction as the shaft 2, the drive being direct from the latter to the shaft 3, the lay or countershaft 4, and the wheels 6.14, 7.15, 8.25.16 merely idling, and being driven through the wheels 13 and 5. With the clutch shoes 35 engaged in and gripping one of the wheels 14, 15, the drive is from the shaft 2, through the wheels 13 and 5, to the lay or counter shaft 4, and back to the shaft 3 through whichever of the pair of wheels 14.6 or 15.7, the member of which surrounding the shaft 3 is clutched to the latter, the other wheels idling, the shaft 3 turning in the same direction as, but at a different speed to the shaft 2.

When the clutch shoes 35 are engaged in and grip the wheel 16, the drive is from the shaft 2 through the wheels 13 and 5, to the lay or countershaft 4, and back to the shaft 3, through the wheels 8, 25 and 16, which gives reverse motion to said shaft 3.

If it is desired to run the shaft 2 without driving the shaft 3, the clutch shoes 35 are moved to a position in which they will not engage in the rim disc 11, or in any of the wheels 14, 15, 16, such a position being obtained by expanding said shoes 35 in a cross member 19.

In the alternative form of clutch illustrated in Figs. 6 and 7, the circular end piece 28 of the clutch body 27, instead of being provided with clutch shoes 35, contains radial slots 47 in which are slidable radial jaws 48 kept in position in the slots 47 by a cover plate 49 secured to the outer side of the end piece 28. The inner ends of the jaws 48 are formed with shanks 48a around which are placed springs 50 in compression between shoulders on the jaws 48 and the inner ends of the slots 47, the shanks 48a being entered in holes 51 opening into the slots 47. Normally the springs 50 force the jaws 48 outwards so that their outer ends enter grooves or recesses 52 in the interior surface of the rim disc 11 or whichever of the wheels 14, 15, 16 it is desired to lock to the shaft 3.

In order to secure the withdrawal of the jaws 48 from the grooves or recesses 52 in the rim disc 11 or a gear wheel, said jaws 48 are provided with projecting side pins 53, which normally contact with inclined surfaces 54a at the outer ends of pairs of projections 54 carried by a disc 55 which surrounds the sleeve 38 having thereon the screw thread 38a.

The pairs of projections 54 project through the rear of the end piece 28 of the clutch body 27, and the members of each pair pass one at each side of a jaw 48 outside the side pins 53 carried thereon.

Upon the toothed wheel 42 being worked along the screw thread 38a, under turning movement of the rod 40 and pinion 41, it slides the disc 55 along the sleeve 38 and causes the inclined surfaces 54a of the projections 54 to act on the pins 53 and draw the jaws 48 inwards and out of the grooves or recesses 52, in the disc or wheel with which the shaft 3 may be locked, following which the clutch can be slid to any desired position by means of the rod 33, as before described.

Owing to the end piece 28 of the clutch body 27 and the latter as well as the disc 55 rotating with the shaft 3, while the sleeve 38 does not rotate, a ring carrying friction balls 56 is interposed between the toothed wheel 42 and the disc 55.

When the toothed wheel 42 is given reverse movement along the screw thread 38a the disc 55 is moved from the end piece 28 under the expansion of springs 57 fitted between said end piece 28 and said disc 55, the projections 54 being withdrawn sufficiently to enable the jaws 48 to be thrust outwards under the expansion of the springs 50 and to again lock the shaft 3 to the rim disc 11 or gear wheel in which the clutch is inserted.

The end 34 of the gear box is made detachable and a removable cover 58 is provided to give access to the interior of the box.

The clutch when contracted can be slid through all of the wheel bores surrounding the shaft 3 and into the rim disc 11 by means of the rod 33, and upon the release of the pedal or lever through which the rod 40 is turned to contract the clutch, the latter automatically expands and holds fast in the selected gear or the disc 11.

The mechanism is adapted for use wherever a variable drive is required, such as on a motor vehicle, lathe, milling machine, or the like.

The lay or countershaft 4 is supported by its ball bearings 9 in such a way that by removing one cap 59 from one bearing it can be removed.

What I do claim and desire to obtain by Letters Patent of the United States of America is:—

1. In a clutch mechanism of the kind described, a shaft, a clutch body keyed on said shaft, a gear wheel surrounding said body and constituting a driving element, expanding and contracting members on the body for engaging the gear wheel, a sleeve surrounding said body, a screw thread on the sleeve, an internally screw threaded toothed wheel working on the screw thread on the sleeve, clutch control means associated with the expanding and contracting members and operated by axial displacement of said toothed wheel and a pinion and rod for imparting turning movement to the internally screw threaded toothed wheel, to cause the latter to operate the control means to adjust the expanding and contracting members, to release or to grip said gear wheel surrounding the shaft.

2. In an arrangement as claimed in claim 1, wherein the expanding and contracting members comprise shoes, and said control means including a screw having thereon a right handed and a left handed screw thread entered in said shoes for expanding and contracting said shoes under the turning action of said screw.

3. In an arrangement as claimed in claim 1, wherein the expanding and contracting members comprise shoes pivoted to an end piece on the clutch body, and grooved to pass on a rib thereon, said control means including a screw having thereon a right handed screw thread and a left handed screw thread for engagement in opposite shoes so that a turning movement of the screw effects an expansion or contraction of said members.

4. In an arrangement as claimed in claim 1, wherein the expanding and contracting members comprise shoes pivoted to an end piece on the clutch body, and grooved to pass on a rib thereon, a turnable screw having thereon a right handed screw thread and a left handed screw thread; said screw threads being entered in opposite shoes for expanding and contracting the shoes under the turning action of the screw; a forked member having its centre portion keyed on said screw, passing over the sleeve with the screw thread thereon, rocking pieces on said forked member, bearing against the internally screw threaded gear wheel, and springs in compression placed between an end piece on the clutch body and said rocking pieces.

5. In an arrangement as claimed in claim 1, wherein said gear wheel is grooved and wherein the expanding and contacting members comprise jaws slidable radially in an end piece of the clutch body and having shanks at the inner ends thereof; springs surrounding said shanks for forcing the latter outwards into said grooved gear wheel; side pins on said jaws; pairs of projections formed with bevelled ends, a disc carrying said projections and surrounding the sleeve with the screw thread thereon, said disc being given sliding movement by the internally screw threaded toothed wheel to cause said projections to engage said pins and withdraw the jaws from said gear wheel; springs in compression between the end piece of said body and said disc, and a ring carrying friction balls between the latter and the internally screw threaded toothed wheel.

6. In an arrangement as claimed in claim 1, wherein the gear wheel is grooved and wherein the expanding and contracting members comprise spring pressed jaws slidable radially in an end piece of the clutch body to engage in said grooved gear wheel, and means for withdrawing the jaws from such engagement including pins on said jaws, a disc slidable under pressure exerted by the internally screw threaded toothed wheel, and projections having inclined surfaces and carried by the disc for coacting with the pins.

FREDERICK HOWE HADFIELD.